United States Patent Office.

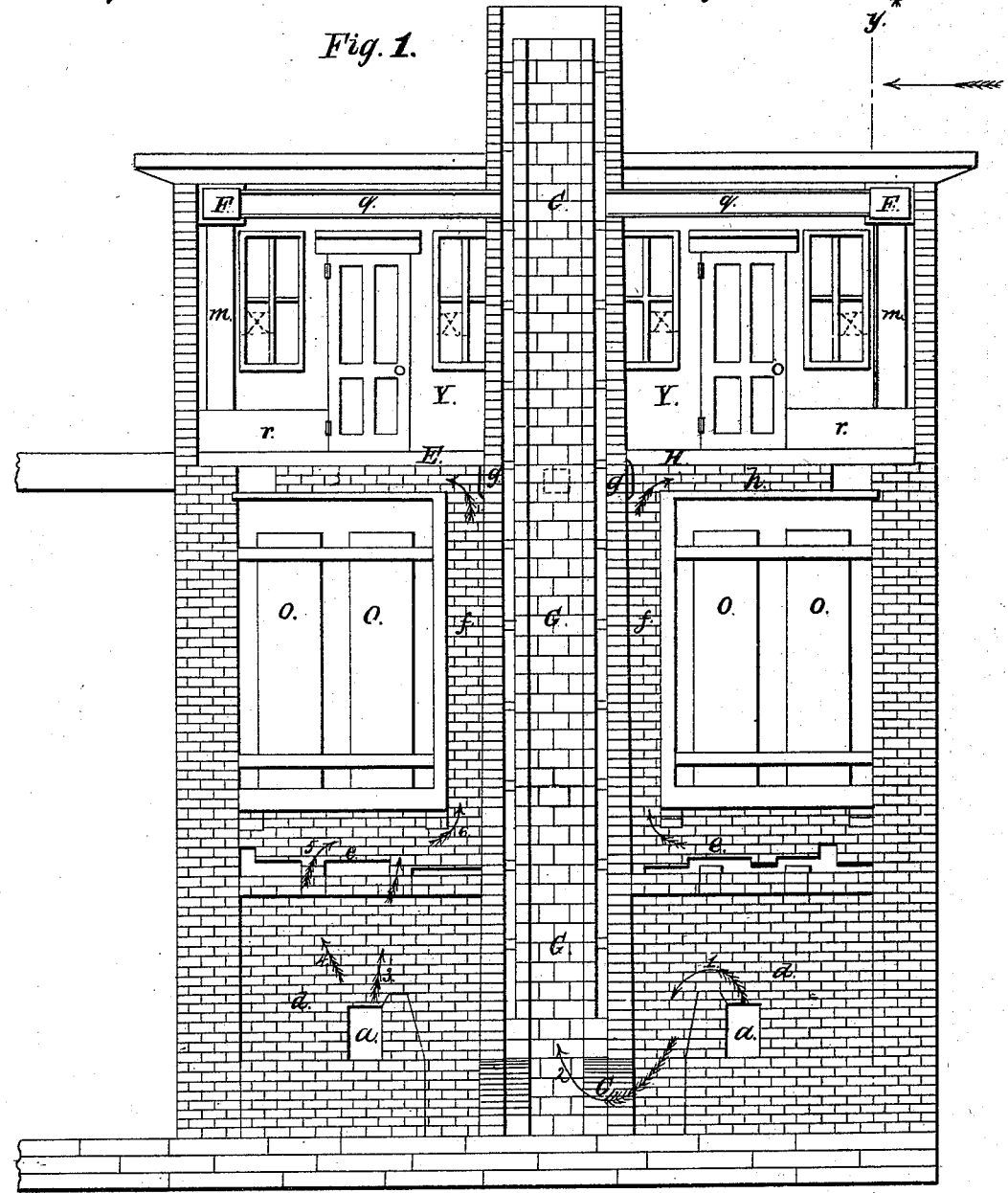

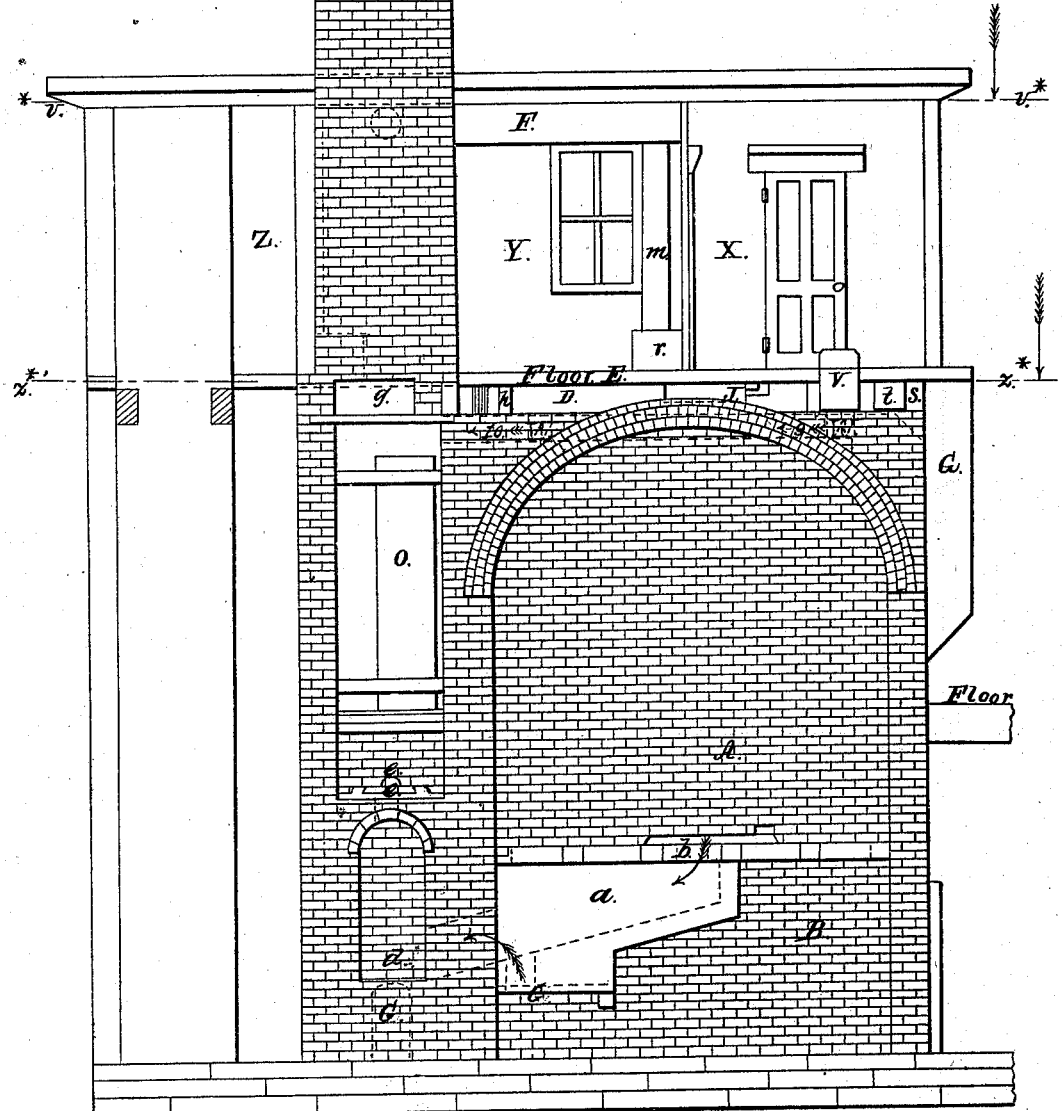

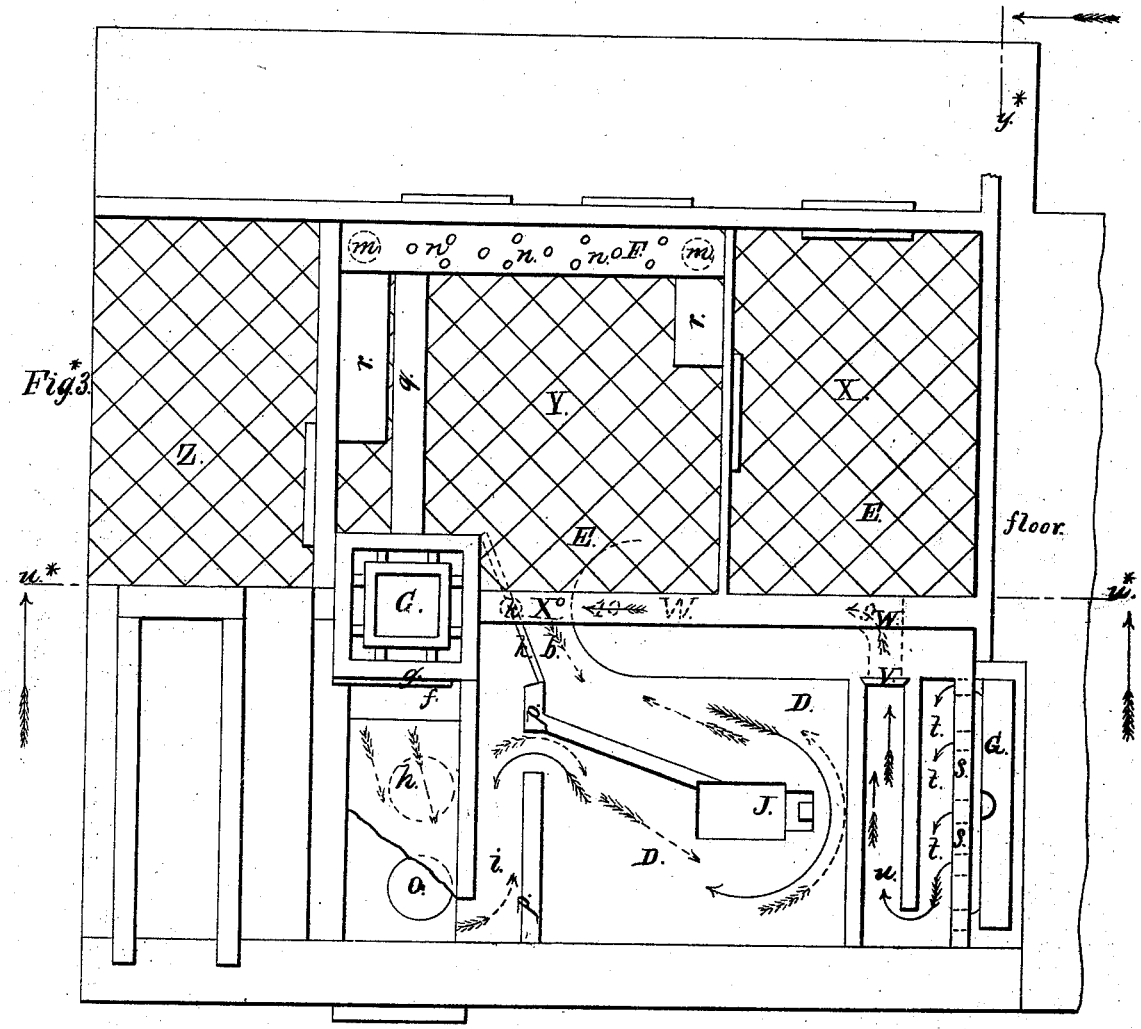

JAMES PERRY, OF BROOKLYN, NEW YORK.

Letters Patent No. 78,231, dated May 26, 1868.

COMBINED OVEN AND BATH.

*The Schedule referred to in these Letters Patent and making part of the same.*

TO ALL WHOM IT MAY CONCERN:

Be it known that I, JAMES PERRY, of Brooklyn, in the county of Kings, and State of New York, have invented a new and useful Combined Oven and Bath; and I do hereby declare that the following is a sufficiently full, clear, and exact description thereof to enable those skilled in the arts and uses of the same to understand, construct, and apply them to practice, reference being had to the accompanying drawing, which makes part of this specification.

The object of my invention is to obtain a greater amount of useful effect from the combustion of a given quantity of fuel used in the process of manufacturing bread than is at present obtained.

It has been discovered in practice, and can be demonstrated by science, that in the baking of bread of all descriptions a large amount of heat is distributed through the atmosphere when the products of combustion, in heating the oven or ovens to the proper degree for use, are directly carried off by the draught of the chimney, and that a great amount is thus wasted by the heat rendered latent in the vaporization of the fluids that unavoidably occurs by the high temperature necessary to the process of baking, and also in the tempering of the oven by water, and the cooling of the baked products after they have been baked.

That this heat hitherto wasted may be applied to a useful purpose, it is necessary to associate such other art or pursuit with the process of baking as shall, by its nature and requirements, admit of utilizing it advantageously; and it is therefore believed by the inventor that no other art requiring the application of heat in its processes is so well adapted to this end as the administration of baths, for the reason that the temperature of the media for such purpose is sufficiently low to render sensible and therefore available the large amount of latent heat that has hitherto been wasted, as above set forth.

My invention therefore consists in combining, with an oven or ovens and their furnace or furnaces, a room or rooms, by means of heat-ducts, conductors, pipes, or their equivalents, in such manner that the hitherto wasted heat from said products of combustion, vapors, hot-baked products, or any of them, may cause the temperature of the air in the said room or rooms to rise to the required degrees for the administration of hot-air and other baths, whereby I am enabled to employ the heat which is at present allowed to escape and be wasted for a useful and highly sanitary purpose.

In the accompanying drawings, which illustrate my invention, I have shown two ovens adjoining each other, and enclosed spaces on each side of the chimney, and the bathing-chamber or rooms to be warmed by the waste heat immediately over the ovens, the floors of one of the suite of rooms being removed to expose some of the waste-heat ducts under the same.

Figure 1 is a transverse vertical section through both ovens, taken in the plane of the line $x^*$ $x^*$, fig. 2, (see red arrows.)

Figure 2 is a longitudinal vertical section, taken in the plane of the line $y^*$ $y^*$, fig. 1, as high as the plane of the line $z^*$ $z^*$, but the balance of fig. 2 represents the view of bath-rooms lying beyond the vertical plane of the line $u^*$ $u^*$, fig. 3 3*.

Figure 3 3* is a plan view of what lies below the horizontal planes, in which the lines $z^*$ $z^*$ and $v^*$ $v^*$ of fig. 2 are taken, fig. 3 exposing what may be seen below the plane $z^*$ $z^*$, fig. 3* that which is exposed below the plane $v^*$ $v^*$.

Similar letters of reference indicate like parts in all the figures.

A, fig. 2, designates one of an ordinary kind of oven for baking purposes, and B the place where the furnace for heating the oven is located. A draught-way or outlet, $a$, communicates with the oven A by a damper, $b$, and with the furnace and its flues by a damper, $c$, and opens into a receiving-chamber, $d$, which has an outlet into the chimney C, as shown by the arrows 1–2 at the right of the base of the chimney, fig. 1.

The products of combustion from the furnace, or the excess of hot gases which accumulate in the lower part of the oven, may thus be caused to pass off directly into the chimney, if desired; but if it be desired to make the products of combustion or the excess of heat hitherto wasted, and therefore designated waste heat, serve a useful purpose, the same may be accomplished by opening a damper, e, when the said hot gases will ascend a passage-way or duct, f, as indicated by the arrows 3, 4, 5, 6, at the left of the base of the chimney, fig. 1, and thus keep an enclosed space containing boilers or water-receivers, O O, sufficiently heated, and the water also to the proper degree, and therefore a supply of such water is always provided for baking and bathing purposes by the employment and saving of some of the heat of the hot gases which are forced to escape by the excess of pressure in the oven produced by the process of baking, which heat, with ovens as now constructed and used, is allowed to escape into the building and chimney, and thus be wasted, and at the same time be injurious to the preparation of the dough.

At the top of the duct f there is a damper, g, opening an aperture into the chimney, which, when open, allows the hot current ascending the duct f to escape, the draught of the chimney being sufficient to cause it to do so; but it is intended to employ the heat of the hot current for a still further useful purpose, and to accomplish this the damper g may be partly or entirely closed, as the case may require, when the current will pass along the horizontal duct h, and along another duct, i, and into the long and wide duct or space D under the flooring E which extends over the said space.

Provision is made for using the waste heat, &c., from either one of the ovens for heating the suite of rooms over the other oven when the latter is not heated or in use. This is effected by a damper, k, which, in the present instance, turns upon an axis in its centre, and thus connects the passage-way or short duct l with the space D or i of either oven, at the will of the operator, and hence the current moves from either hot oven to the spaces and ducts of the colder one, provided the damper g, directly opposite g in the chimney, be open when the latter is closed.

One end of the damper K, in the arrangement shown, is caused, when in one position, to rest against the partition p, which extends partly across the space D, and the other end to rest against the outer wall of the chimney.

In some cases it will be desirable to convey the waste heat through pipes or radiating-apparatus inside of some of the rooms.

In figs. 1 and 3, I have shown two vertical pipes, m m, connected by a horizontal radiating-apparatus, F, having vertical tubes, n, passing through it, and from this latter, F, the pipe q proceeds to the chimney.

The pipes m m are attached, at their lower ends, to seats, r r, which may be provided with a system or nest of pipes through which the waste steam from the motive-power of the establishment may discharge its heat, as well as the steam and vapors that are generated in the ovens. This arrangement admits also of using steam directly from the motive-power boilers, and from the boilers O O, by connecting them by pipes and fixtures, as is usually done in similar cases.

To regulate the draught in and through the pipes m m and q, an ordinary damper, commonly applied to cylindrical pipes, is to be inserted in the latter, near the chimney, or there may be one of such applied to each of the vertical pipes m m.

Such or a somewhat similar arrangement of pipes, radiators, and dampers, or even a part of them, within a room, provides the means by which a much greater amount of the waste heat may be made to serve a useful purpose, as, also, when both dampers, g g, (see fig. 1,) are closed, all the currents from one or both ovens may be made to pass through them, distributing the heat between the suites of rooms, as required by the adjustment of the dampers in the pipes q q, (see fig. 1.)

When the doors of the ovens are opened to charge and discharge the latter, a large amount of hot gases and vapors escapes into the rooms, the heat of which renders the rooms oppressively warm and disagreeable.

To obtain a remedy for this defect, and to make use of this portion of the hitherto wasted heat, I attach to the oven walls a sufficiently large receiving-box or other device, G, directly over the oven-door or mouth, which catches such escaping heat and conveys it upward, whence it passes through apertures in a partition, S, and into a duct, t, and from this latter duct into another duct, w Here it can be retarded or confined by operating a damper, v, which connects the ducts t u with a central duct or flue, w, in the centre wall, which leads into the chimney, as indicated by the dotted arrows 9–10.

The damper v serves further to shut off the draught through this centre place, w, when the oven to which it belongs is not in use or heated, else a current of too cold air would at some seasons pass through the ducts t u w.

In any case wherein but one oven and one suite of bath-rooms are constructed, the damper k would not be required, as the partition p in that case would extend to the centre wall, whereat the duct i would end, and to cause the current to move in the direction of the red arrows in the ducts h, i, and D, a damper may be located at the point x opening into the flue w. But two suites of bath-rooms may be located over one oven with the same arrangements as are represented in the drawing, and by suitable positions of the dampers in other situations as respects that of the oven.

It is requisite that none of the products of combustion and offensive gases and fumes from any source should enter the bath-rooms, so as to come in actual contact with the persons therein, whether bathers, attendants or others, as a pure and comparatively dry air gives greater pleasure and sanative effects than when impurities are permitted to contaminate it.

In constructing the floors and all other apparatus within the suites of bath-rooms, it is therefore necessary to take sufficient precaution to insure that they shall be tight, and not become liable to leak.

In the construction of the floors, I prefer to lay a metallic covering or cap upon the partitions and walls of the ovens under them, and upon iron beams of suitable size and strength built in or otherwise therewith, so as to form a rigid foundation, on which the balance of the floor of the bath-rooms rests. The balance of the flooring I prefer to construct of lime, sand, and cement, and slabs of marble laid upon the top of the cement and the other materials.

It is advisable that the flooring be laid in contact with the upper surfaces of the partitions which form the ducts under them, so that the latter become efficient for the purposes intended, that is, to cause the hot currents to circulate under all parts of the flooring. The floors thus composed and constructed become good conductors and radiators of heat.

I do not, however, limit myself to this particular kind of floor, nor do I confine myself to the arrangement that requires the bath-room or rooms to be placed directly above the ovens.

For obvious reasons, the latter is a good position, but circumstances, as to location and buildings, may require the bath-rooms to be differently located as respects the oven or ovens, and as the hot products of combustion, gases, and vapors can be conveyed in a volume or volumes from the oven or ovens to the enclosed spaces, ducts, or conductors under the flooring of the bath-rooms, where the heat is to be employed, it is practicable to locate the bath-rooms at any distance from the ovens, so long as a natural or artificial draught be obtained to effect this end. And I propose, where it may be desirable, to employ this heat not only under the floor, and in pipes and radiators within the bath-rooms, but between the walls and partitions of the room or rooms, a space or spaces being provided for the purpose, or tubes, or pipes, or radiators being properly arranged therein.

Thus the great object of my invention, namely, "to obtain a greater amount of useful effect from the combustion of a given quantity of fuel used in the process and manufacture of bread," is made practicable, and thereby I produce a great and necessary economy in the use of fuel, and a much needed and effectual sanitary treatment is made possible and convenient to a very large proportion of the public, and to conduce to the removal of a serious obstacle in the preparation of the dough, as will be presently explained.

In bakeries in general, and in large ones in particular, there is a large amount of heat not only wasted, but wasted in such way as to be very injurious to the process of preparing the materials for the bread. The temperature of the bake-houses, in consequence of so much heat escaping from the ovens in some of the ways herein specified, is almost always much too high, and it therefore affects the dough often very injuriously, and it was a subject of much reflection with me to determine in what manner to best avoid these deleterious results, and I therefore devised the combination of the bath and oven for the purposes and effects herein set forth, as at once the most useful and most needed.

Those persons who have experienced the salutary and luxurious effects of the hot-air bath properly administered, know and will testify that it is a valuable sanitary and efficient promoter of health and comfort, and that it should be much more generally introduced and practised.

It may be well to remark here that the process of administering hot-air baths to well persons and convalescents consists in subjecting them gradually to increased temperatures. At first the air is not many degrees above the natural temperature of the body.

The persons first enter a room or chamber heated to about 120° Fahrenheit, and after first wetting their heads with warm water, they remain in such chamber somewhat less than half an hour. Room marked X in the drawings corresponds to this chamber.

They next enter another room or apartment heated to about 150° Fahrenheit, in which it is not often necessary to remain longer than one-fourth of an hour. Room marked Y represents this apartment.

They next go into an adjoining apartment, provided with a couch and other necessary apparatus, in which an attendant cleanses the surface of their bodies, and promotes the discharge of the effete matters which the increased quantity of blood brings to the surface and capillaries by the heat, by manipulating the skin in various ways, as rubbing, compressing, kneading, and the like, and finally by washing with good soap and water at about the same temperature of the body, which, by this time, is not many degrees above 98°. The suds are then washed off with water, the temperature of which gradually falls to about 90°, or the party may plunge into a basin or cistern expressly adapted for this purpose, as to quantity, quality, and temperature of the water within it, immediately after the suds have been washed off. Z represents the locality of this room as to its proximity to the others used in the hot-air baths.

The party is next partially dried with clean towels, and loosely wrapped in a sheet or wrapper, and then goes to another apartment, in which a blanket is added to the wrapper, and he now reposes in an inclined position on an easy-chair or on a couch until the pores of the skin have contracted to their normal condition and the skin properly dried. The party is then in a proper condition to go into the open air without danger of catching cold or the like.

In dry hot air many persons feel comfortable at much higher temperatures, some enjoying the bath at near 200° Fahrenheit; but such high temperatures are not necessary only in particular cases, and should be always administered by an experienced and competent person.

Generally the whole time required to obtain a good cleansing hot-air bath is between one and a half to two hours, and the maximum temperature, 160°

The constant increase of the population of a country necessitates more stringent economy in the expenditures of all communities wherein such increase occurs; and the wants growing out of the surplus population of large cities and towns make it necessary that nothing be wasted that can be advantageously applied to a useful purpose.

From the above description, it will be seen that the objects and purposes of my invention are fully obtained.

By the combination herein specified, I am enabled to obtain a much greater amount of useful effect from the combustion of a given quantity of fuel used in the process of manufacturing bread.

What I claim as my invention, and desire to secure by Letters Patent, is—

1. The method of utilizing the heat from the interior of a baking-oven or furnace for the purpose of warming apartments, substantially as herein specified.

2. I claim the spaces under or by the sides of bath-rooms, with their pipes communicating with the open furnace or oven, when the arrangement of the several parts is substantially as and for the purpose of operating in the manner shown.

3. I claim the combination of the boilers O O, located in an enclosed space, with one or more conductors of the waste heat from a baking-oven, whereby the said waste heat is caused, without coming in direct contact with said boilers, to warm the water required for use in the manufacture of bread and the administration of baths, substantially as herein specified.

4. I claim the combination, with a system of radiating-pipes located in an apartment, of a series of waste-heat conducting-pipes, and a series of steam-conducting pipes, so that either the waste heat or the steam, or both together, may be employed at such time as may be required for warming the apartment, substantially as herein specified.

JAMES PERRY.

Witnesses:
M. M. LIVINGSTON,
T. B. BEECHER.